US012617401B2

(12) United States Patent
Tomioka et al.

(10) Patent No.: US 12,617,401 B2
(45) Date of Patent: May 5, 2026

(54) VEHICLE CONTROL DEVICE AND CONTROL METHOD

(71) Applicant: HONDA MOTOR CO., LTD., Tokyo (JP)

(72) Inventors: Kazuki Tomioka, Tokyo (JP); Yoshimitsu Murahashi, Tokyo (JP); Soichiro Ueura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/788,192

(22) Filed: Jul. 30, 2024

(65) Prior Publication Data

US 2025/0042399 A1     Feb. 6, 2025

(30) Foreign Application Priority Data

Aug. 2, 2023     (JP) .................................. 2023-126540

(51) Int. Cl.
*B60W 30/16* (2020.01)
*B60W 50/00* (2006.01)

(52) U.S. Cl.
CPC ... *B60W 30/162* (2013.01); *B60W 2050/0068* (2013.01); *B60W 2510/205* (2013.01);
(Continued)

(58) Field of Classification Search
CPC .......... B60W 30/045; B60W 30/0953; B60W 30/0956; B60W 30/143; B60W 30/16;
(Continued)

(56) References Cited

U.S. PATENT DOCUMENTS

2007/0228713 A1* 10/2007 Takemura ............... B60R 22/46
                                                      297/216.13
2011/0238272 A1*  9/2011 Kato ..................... B60W 30/14
                                                      701/55
(Continued)

FOREIGN PATENT DOCUMENTS

JP      2006-185139 A    7/2006
JP         4052292 B2    2/2008
(Continued)

OTHER PUBLICATIONS

May 7, 2025, Translation of Japanese Office Action issued for related JP Application No. 2023-126540.

*Primary Examiner* — Peter D Nolan
*Assistant Examiner* — Ce Li Li
(74) *Attorney, Agent, or Firm* — Paratus Law Group, PLLC

(57) ABSTRACT

A vehicle control device is configured to execute travel control of controlling a vehicle such that a travel speed of the vehicle is a target speed corresponding to an inter-vehicle distance between the vehicle and a preceding vehicle traveling in front of the vehicle, or a predetermined target speed set by a driver of the vehicle, and acceleration limit control of limiting acceleration of the vehicle by the travel control. The vehicle control device includes a controller configured to execute the acceleration limit control when an intention to turn right or left of the driver is detected in the vehicle traveling under the travel control, and to end the acceleration limit control in response to a decrease in a steering speed in the vehicle during the acceleration limit control.

9 Claims, 7 Drawing Sheets

(52) U.S. Cl.
CPC ..... *B60W 2540/18* (2013.01); *B60W 2554/80* (2020.02); *B60W 2720/106* (2013.01); *B60W 2754/10* (2020.02)

(58) Field of Classification Search
CPC ......... B60W 30/162; B60W 30/18145; B60W 50/14; B60W 2050/0068; B60W 2050/143; B60W 2050/146; B60W 2510/205; B60W 2520/10; B60W 2520/105; B60W 2520/14; B60W 2540/12; B60W 2540/18; B60W 2540/20; B60W 2552/53; B60W 2554/80; B60W 2710/205; B60W 2710/207; B60W 2720/106; B60W 2754/10
See application file for complete search history.

(56) References Cited

U.S. PATENT DOCUMENTS

| | | | |
|---|---|---|---|
| 2017/0282917 A1* | 10/2017 | Pilutti | B60W 30/143 |
| 2020/0164870 A1* | 5/2020 | Takahashi | B60W 30/045 |
| 2022/0097684 A1* | 3/2022 | Kadoya | B60W 30/143 |
| 2023/0278552 A1* | 9/2023 | Park | B60W 30/0953 701/93 |

FOREIGN PATENT DOCUMENTS

| | | |
|---|---|---|
| JP | 2009-126433 A | 6/2009 |
| JP | 2022-057333 A | 4/2022 |

* cited by examiner (CONT.)

(FIG. 1 CONTINUED)
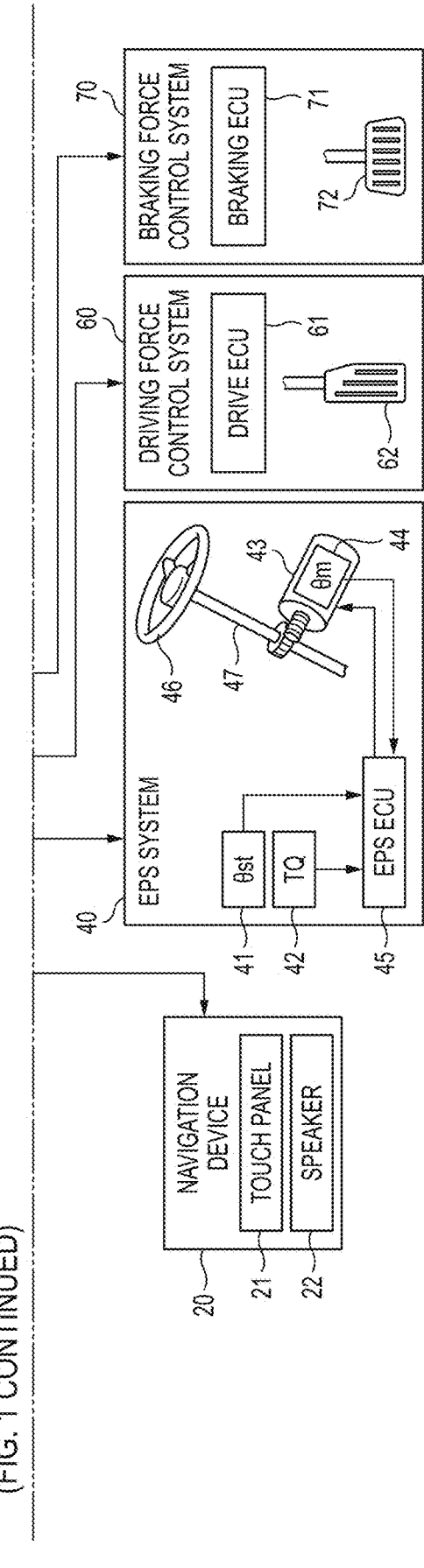

*FIG. 4*

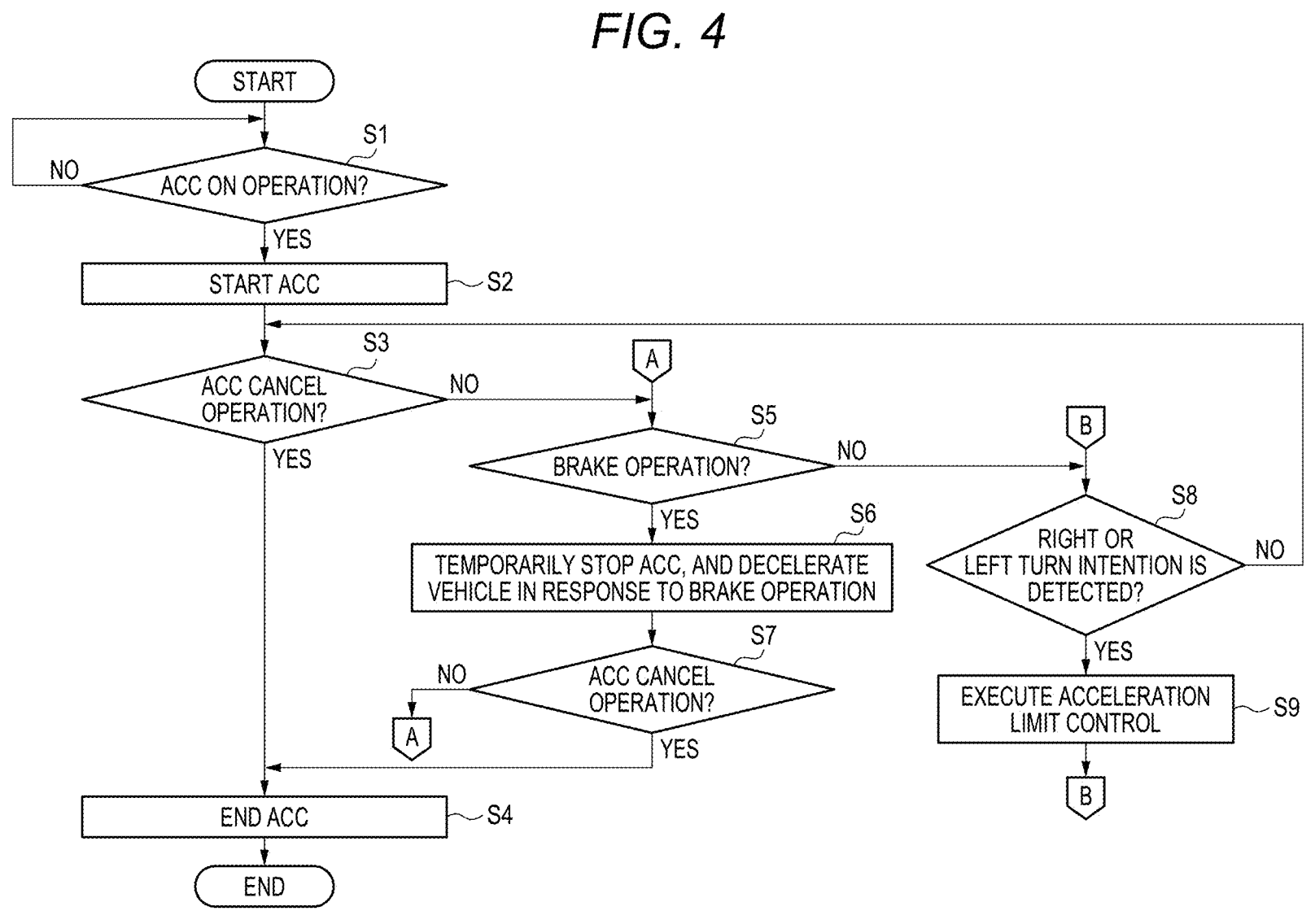

START

S1 ACC ON OPERATION?
NO → (loops back to START)
YES ↓

S2 START ACC

S3 ACC CANCEL OPERATION?
YES → END ACC
NO ↓

(A)

S5 BRAKE OPERATION?
YES ↓
NO → (B)

S6 TEMPORARILY STOP ACC, AND DECELERATE VEHICLE IN RESPONSE TO BRAKE OPERATION

S7 ACC CANCEL OPERATION?
NO → (A)
YES → END ACC (B)

S8 RIGHT OR LEFT TURN INTENTION IS DETECTED?
NO → (loops back)
YES ↓

S9 EXECUTE ACCELERATION LIMIT CONTROL → (B)

S4 END ACC

END

VEHICLE CONTROL DEVICE AND CONTROL METHOD

CROSS-REFERENCE TO RELATED APPLICATIONS

This application is based on and claims priority under 35 USC 119 from Japanese Patent Application No. 2023-126540 filed on Aug. 2, 2023, the contents of which are incorporated herein by reference.

TECHNICAL FIELD

The present disclosure relates to a vehicle control device and a control method.

BACKGROUND

In recent years, attempts have been made to provide access to a sustainable transportation system in consideration of vulnerable traffic participants. As one of the attempts, research and development on driving support technique and automated driving technique of a moving object (for example, a vehicle such as an automobile) have been performed in order to improve safety and convenience of traffic.

For example, Japanese Patent Publication No. 4052292 below discloses a technique of detecting a steering amount by a driver and setting a control amount of deceleration control according to the steering amount.

Japanese Patent Application Laid-Open Publication No. 2009-126433 below discloses a technique of, in a situation where vehicle speed automated control for controlling the vehicle speed in an automated manner is on, maintaining the on state of the automated vehicle speed control when the vehicle turns right or left at an intersection.

However, in the related art, for example, when a vehicle traveling under travel control referred to as adaptive cruise control (ACC) turns right or left, the driver may feel discomfort, and there is room for improvement in this regard.

The present disclosure relates to providing a vehicle control device and a control method capable of preventing a driver from feeling discomfort when a vehicle turns right or left while traveling under travel control of controlling the vehicle such that the travel speed of the vehicle is a target speed corresponding to an inter-vehicle distance between the vehicle and a preceding vehicle traveling in front of the vehicle or a predetermined target speed set by the driver. This further improves traffic safety, and contributes to development of a sustainable transportation system.

SUMMARY

A first aspect of the present disclosure relates to a vehicle control device, in which the vehicle control device is configured to execute travel control of controlling a vehicle such that a travel speed of the vehicle is a target speed corresponding to an inter-vehicle distance between the vehicle and a preceding vehicle traveling in front of the vehicle, or a predetermined target speed set by a driver of the vehicle, and acceleration limit control of limiting acceleration of the vehicle by the travel control, and the vehicle control device includes a controller configured to execute the acceleration limit control when an intention to turn right or left of the driver is detected in the vehicle traveling under the travel control, and to end the acceleration limit control in response to a decrease in a steering speed in the vehicle during the acceleration limit control.

A second aspect of the present disclosure relates to a control method executable by a computer for executing travel control of controlling a vehicle such that a travel speed of the vehicle is a target speed corresponding to an inter-vehicle distance between the vehicle and a preceding vehicle traveling in front of the vehicle, or a predetermined target speed set by a driver of the vehicle, and acceleration limit control of limiting acceleration of the vehicle by the travel control, the control method including:

executing the acceleration limit control when an intention to turn right or left of the driver is detected in the vehicle traveling under the travel control; and ending the acceleration limit control in response to a decrease in a steering speed in the vehicle during the acceleration limit control.

According to the present disclosure, it is possible to provide a vehicle control device and a control method capable of preventing a driver from feeling discomfort when a vehicle traveling under constant speed travel control turns right or left.

BRIEF DESCRIPTION OF DRAWINGS

Exemplary embodiments of the present disclosure will be described in detail based on the following figures, wherein

FIG. 4 is a flowchart illustrating an example of processing executed by the control device 30 for executing ACC and acceleration limit control;

DESCRIPTION OF EMBODIMENTS

Figure 1:
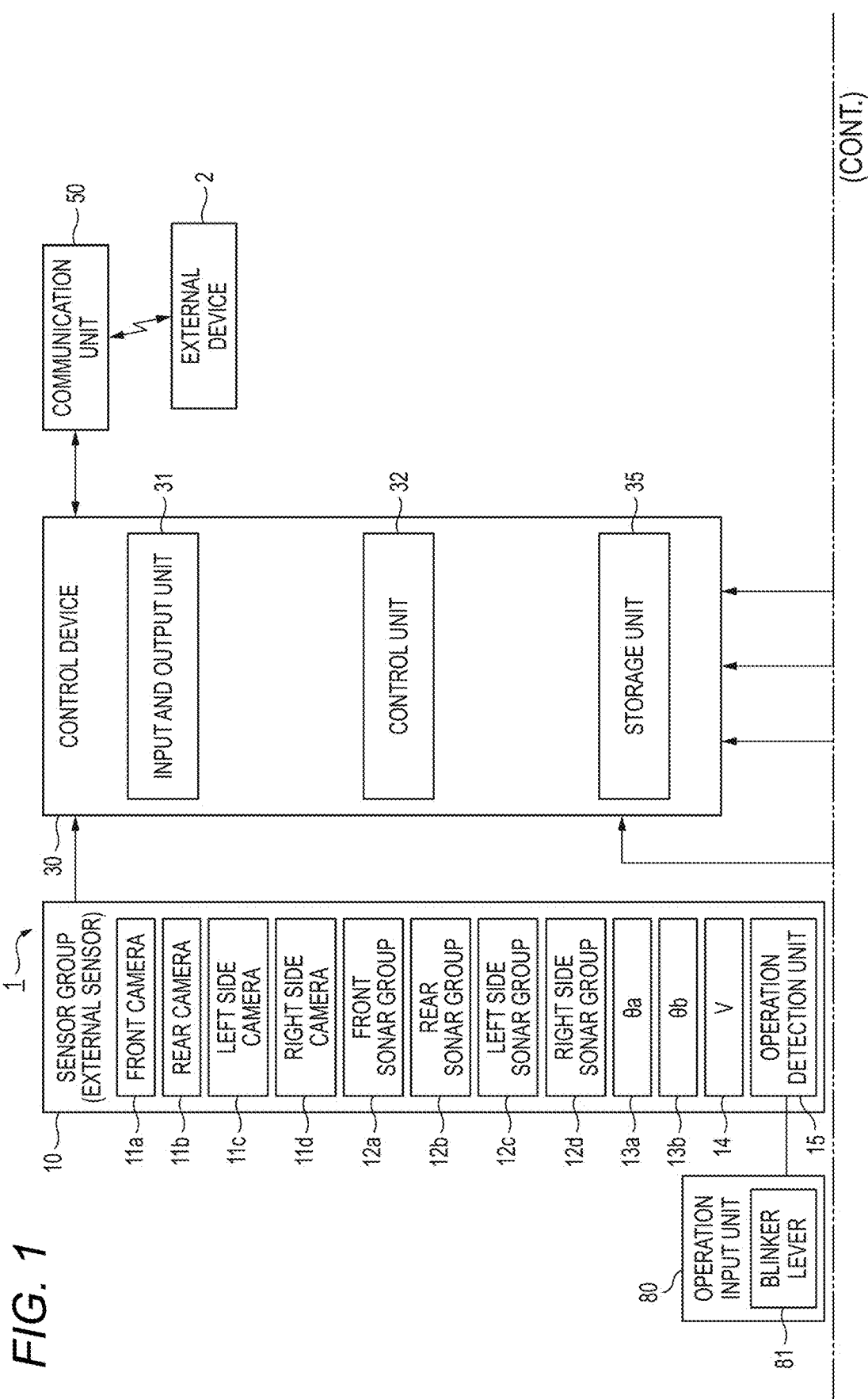
FIG. 1 is a diagram illustrating a vehicle 1 controlled by a control device 30 according to an embodiment of the present disclosure.

Hereinafter, an embodiment of a vehicle control device and a control method of the present disclosure will be described in detail with reference to the drawings. The drawings are viewed in directions of reference numerals. The following embodiment does not limit disclosure disclosed in the claims, and not all combinations of features described in the embodiment are necessarily essential for the disclosure. Two or more features among a plurality of features described in the embodiment may be combined freely. Further, in the following description, the same or similar elements are denoted by the same or similar reference numerals, and description thereof may be omitted or simplified appropriately.

Configuration of Vehicle

FIG. 1 is a diagram illustrating a vehicle 1 controlled by a control device 30 that is an embodiment of a vehicle control device of the present disclosure. The vehicle 1 illustrated in FIG. 1 is an automobile including a drive source, and wheels (none illustrated) including drive wheels driven by power of the drive source and driven wheels that can be steered. For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of the electric motor and the internal combustion engine. Further, the drive source of the vehicle 1 may drive the pair of left and right front wheels, the pair of left and right rear wheels, or the four wheels including the pair of left and right front wheels and the pair of left and right rear wheels. Any one of the front wheels and the rear wheels may be driven wheels that can be steered, or both of the front wheels and the rear wheels may be driven wheels that can be steered.

As illustrated in FIG. 1, the vehicle 1 includes a sensor group 10, a navigation device 20, a control device 30, an EPS system (electric power steering system) 40, a communication unit 50, a driving force control system 60, a braking force control system 70, and an operation input unit 80.

The sensor group 10 obtains various detection values related to the vehicle 1 or a periphery of the vehicle 1. The detection values obtained by the sensor group 10 are sent to the control device 30, and provided for control of the vehicle 1 (for example, ACC to be described later) performed by the control device 30.

The sensor group 10 includes, for example, a front camera 11a, a rear camera lib, a left side camera 11c, a right side camera 11d, a front sonar group 12a, a rear sonar group 12b, a left side sonar group 12c, and a right side sonar group 12d. The camera group and the sonar group can function as external sensors that obtain peripheral information on the vehicle 1.

The front camera 11a, the rear camera lib, the left side camera 11c, and the right side camera 11d output image data of the peripheral images obtained by imaging the periphery of the vehicle 1 to the control device 30. The peripheral images captured by the front camera 11a, the rear camera 11b, the left side camera 11c, and the right side camera 11d are also referred to as a front image, a rear image, a left side image, and a right side image. Further, an image constituted by the left side image and the right side image is also referred to as a side image.

The front sonar group 12a, the rear sonar group 12b, the left side sonar group 12c, and the right side sonar group 12d emit sound waves to the periphery of the vehicle 1, and receive reflected sounds from another object. The front sonar group 12a includes, for example, four sonars. The sonars that constitute the front sonar group 12a are provided on an obliquely left front side, a front left side, a front right side, and an obliquely right front side of the vehicle 1. The rear sonar group 12b includes, for example, four sonars. The sonars that constitute the rear sonar group 12b are provided on an obliquely left rear side, a rear left side, a rear right side, and an obliquely right rear side of the vehicle 1. The left side sonar group 12c includes, for example, two sonars. The sonars that constitute the left side sonar group 12c are provided on a left front side and a left rear side of the vehicle 1. The right side sonar group 12d includes, for example, two sonars. The sonars that constitute the right side sonar group 12d are provided on a right front side and a right rear side of the vehicle 1. Instead of or in addition to the sonar groups 12a, 12b, 12c, and 12d, the vehicle 1 may be provided with a radar device that emits radio waves (for example, so-called millimeter radio waves) to the periphery of the vehicle 1 and receives reflected waves from the other object.

The sensor group 10 further includes wheel sensors 13a and 13b, a vehicle speed sensor 14, and an operation detection unit 15. The wheel sensors 13a and 13b detect rotation angles 6a and 6b of the wheels (not illustrated). The wheel sensors 13a and 13b may be implemented by angle sensors or displacement sensors. The wheel sensors 13a and 13b output detection pulses every time the wheels are rotated by a predetermined angle. The detection pulses output from the wheel sensors 13a and 13b can be used for calculating a rotation angle of the wheels and a rotation speed of the wheels. A movement distance of the vehicle 1 can be calculated based on the rotation angle of the wheels. The wheel sensor 13a detects, for example, the rotation angle θa of the left rear wheel. The wheel sensor 13b detects, for example, the rotation angle θb of the right rear wheel.

The vehicle speed sensor 14 detects a vehicle speed V that is a travel speed of the vehicle 1, and outputs the detected vehicle speed V to the control device 30. The vehicle speed sensor 14 detects the vehicle speed V based on, for example, rotation of a transmission countershaft.

The operation detection unit 15 detects an operation content of a driver performed using the operation input unit 80, and outputs the detected operation content to the control device 30. The operation input unit 80 includes, for example, a blinker lever 81 for receiving an operation of activating a direction indicator (referred to as "blinker" as well) of the vehicle 1. The blinker lever 81 can receive, for example, a "right blinker activation operation" that is an operation of activating the right blinker, which is a rightward direction indicator, and a "left blinker activation operation" that is an operation of activating the left blinker, which is a leftward direction indicator.

The operation input unit 80 may further include an operation button, an operation switch, or the like that receives an operation related to the ACC, such as an operation of instructing start and end of the ACC and an operation of setting a target speed to be described later. Further, a part (for example, the operation button that receives the operation related to the ACC) or all of the operation input unit 80 may be shared with a touch panel 21 to be described later.

The navigation device 20 identifies a current position of the vehicle 1 by using, for example, a global positioning system (GPS), and guides the driver on a path from the current position of the vehicle 1 to a destination. The navigation device 20 includes, for example, a storage device (not illustrated) including a map information database.

The navigation device 20 includes a touch panel 21 and a speaker 22. The touch panel 21 is implemented by integrating a display device that can display an image (for example, a liquid crystal display) and an input device that can receive an input of information, and functions as a display device controlled by the control device 30 and an input device that receives an input of various kinds of information to the control device 30. That is, the touch panel 21 can display various screens under control performed by the control device 30, or input various commands received from the driver to the control device 30. Further, the speaker 22 outputs various kinds of guidance by sound under control performed by the control device 30.

The EPS system 40 includes a steering angle sensor 41, a torque sensor 42, an EPS motor 43, a resolver 44, and an EPS electronic control unit (ECU) 45. The steering angle sensor 41 detects a steering angle θst of a steering 46. The torque sensor 42 detects a torque TQ applied to the steering 46. The EPS motor 43 gives a driving force or a reaction force to a steering column 47 coupled to the steering 46, thereby supporting an operation on the steering 46 by the driver (in other words, steering). The resolver 44 detects a rotation angle θm of the EPS motor 43.

The EPS ECU 45 includes, for example, an input and output unit that is an interface for inputting and outputting data between the inside and the outside of the EPS ECU 45, a calculation unit implemented by a processor or the like that can execute various calculations, and a storage unit that can store various information (none illustrated), and performs overall control of the EPS system 40. Further, the EPS ECU 45 outputs information indicating the steering angle θst of the steering 46 detected by the steering angle sensor 41 to the control device 30. Further, the EPS ECU 45 may output information indicating a steering speed ω of the steering 46 to the control device 30. The steering speed ω is obtained by, for example, differentiating the steering angle θst with respect to time.

The communication unit 50 is a communication interface that communicates with an external device 2 under the control performed by the control device 30. That is, the control device 30 can communicate with the external device 2 via the communication unit 50. Examples of the external device 2 can include a terminal device (for example, a smartphone) of the driver and a server device managed by a manufacturer of the vehicle 1. For example, a mobile communication network such as a cellular line, Wi-Fi (registered trademark), Bluetooth (registered trademark), or the like can be adopted for the communication between the vehicle 1 and the external device 2.

The driving force control system 60 includes a drive ECU 61, and can control a driving force of the vehicle 1. The drive ECU 61 includes, for example, an input and output unit that is an interface for inputting and outputting data between the inside and the outside of the drive ECU 61, a calculation unit implemented by a processor or the like that can execute various calculations, and a storage unit that can store various information (none illustrated). The drive ECU 61 controls a driving force of the vehicle 1 by controlling the internal combustion engine, the electric motor, or the like that is a drive source of the vehicle 1 based on an operation of the driver on an accelerator pedal 62 provided in the vehicle 1 (hereinafter, also referred to as an "accelerator operation") or an instruction from the control device 30.

The braking force control system 70 includes a braking ECU 71 and can control a braking force of the vehicle 1. The braking ECU 71 includes, for example, an input and output unit that is an interface for inputting and outputting data between the inside and the outside of the braking ECU 71, a calculation unit implemented by a processor or the like that can execute various calculations, and a storage unit that can store various information (none illustrated). The braking ECU 71 controls a braking force of the vehicle 1 by controlling a brake device (not illustrated) of the vehicle 1 based on an operation of the driver on a brake pedal 72 provided in the vehicle 1 (hereinafter, also referred to as a "brake operation") or an instruction from the control device 30. Here, the brake device includes, for example, a brake caliper, a cylinder that transmits hydraulic pressure to the brake caliper, and an electric motor that generates hydraulic pressure in the cylinder. The braking ECU 71 generates a braking force corresponding to a brake operation by controlling an electric motor of the brake device based on the brake operation or an instruction from the control device 30.

Control Device

The control device 30 is a computer that integrally controls the entire vehicle 1 based on information input from the sensor group 10, the navigation device 20, the EPS system 40, the communication unit 50, the driving force control system 60, the braking force control system 70, and the like.

The control device 30 includes, for example, an input and output unit 31, a control unit 32, and a storage unit 35. The input and output unit 31 is an interface that inputs and outputs data between the inside and outside of the control device 30 under control performed by the control unit 32. The storage unit 35 includes, for example, a non-volatile storage medium such as a flash memory, and stores various information (for example, data and programs) for controlling an operation of the vehicle 1. The control unit 32 is implemented by a processor such as a central processing unit (CPU), and controls constituent elements of the vehicle 1 by executing the programs stored in the storage unit 35 or the like.

In the present embodiment, the control unit 32 can execute "constant speed travel and inter-vehicle distance control" serving as an example of travel control in the present disclosure. The constant speed travel and inter-vehicle distance control is also generally referred to as "adaptive cruise control" (ACC). In the present embodiment, the constant speed travel and inter-vehicle distance control are also referred to as "ACC" hereinafter.

In the ACC, the vehicle 1 is controlled such that the travel speed of the vehicle 1 is a target speed corresponding to an inter-vehicle distance between the vehicle 1 and another vehicle that travels in front of the vehicle 1 (hereinafter, also referred to as a "preceding vehicle"), or a predetermined target speed set by the driver of the vehicle 1. More specifically, the ACC includes "constant speed travel control" of controlling the vehicle 1 such that the travel speed of the vehicle 1 (that is, the vehicle speed V) is the predetermined target speed set by the driver, and "inter-vehicle distance control" of controlling the vehicle 1 such that the inter-vehicle distance between the vehicle 1 and the preceding vehicle traveling in front of the vehicle 1 is substantially constant. That is, during the ACC, when there is no preceding vehicle, the vehicle 1 is controlled so as to reach the target speed set by the driver, and when there is a preceding vehicle, the vehicle 1 is controlled so as to follow the preceding vehicle while keeping the inter-vehicle distance from the preceding vehicle at a substantially constant value.

For example, the control unit 32 starts the ACC in response to the driver performing an operation of instructing the start of the ACC (hereinafter also referred to as an "ACC on operation"), in other words, the reception of the ACC on operation. Thereafter, the control unit 32 ends the ACC in response to the driver performing an operation of instructing the end of the ACC (hereinafter also referred to as an "ACC cancel operation"), in other words, the reception of the ACC cancel operation. That is, after the ACC is started in response to the ACC on operation, the control unit 32 can maintain the ACC until the ACC cancel operation is received. The control unit 32 can also control the vehicle speed V in an automated manner when the vehicle 1 traveling under ACC turns right or left. Thus, when the vehicle 1 traveling under ACC turns right or left, the vehicle 1 can travel at an appropriate vehicle speed V without requiring an accelerator operation and/or brake operation by the driver, thereby improving the safety and convenience of the vehicle 1.

If the driver controls the vehicle speed V or the like to turn the vehicle 1 right or left, the driver generally performs an operation of first quickly turning the steering wheel 46 while keeping the vehicle 1 at a low speed, and accelerating the vehicle 1 while gradually increasing the steering speed ω to finely adjust the steering angle θst when the steering angle θst is increased to a certain degree (that is, when approaching the end of steering). That is, in this case, the acceleration of the vehicle 1 (in other words, the vehicle speed V) can be controlled in conjunction with the steering angle θst and the steering speed ω of the vehicle 1.

On the other hand, in the ACC, the acceleration of the vehicle 1 is usually controlled based on the target speed set by the driver and the inter-vehicle distance from the preceding vehicle. For this reason, when the vehicle 1 traveling under ACC turns right or left, if the acceleration of the vehicle 1 is controlled based on the target speed set by the driver and the inter-vehicle distance from the preceding vehicle as in the normal state, the manner of acceleration of the vehicle 1 may be different from that when the driver controls the vehicle speed V or the like to turn the vehicle 1 right or left. This may cause the driver to feel discomfort.

Here, the control unit 32 is configured to further execute acceleration limit control of limiting the acceleration of the vehicle 1 by the ACC, executes the acceleration limit control when an intention to turn right or left (hereinafter, referred to as "the right or left turn intention") of the driver is detected in the vehicle 1 traveling under ACC, and ends the acceleration limit control in response to a decrease in the steering speed ω in the vehicle 1 during the acceleration limit control. Thereby, when the vehicle 1 traveling under ACC turns right or left, the vehicle 1 can accelerate in a similar manner as that when the driver controls the vehicle speed V or the like to turn the vehicle 1 right or left. This can prevent the driver from feeling discomfort due to the manner of acceleration during right or left turn. Therefore, without an accelerator operation and/or brake operation by the driver, it is possible to promote the utilization of ACC that allows the vehicle 1 to travel at an appropriate vehicle speed V, thereby improving the safety and convenience of the vehicle 1.

For example, the control unit 32 may detect the right or left turn intention of the driver based on both the steering angle θst and the steering speed ω in the vehicle 1 becoming greater than preset thresholds. This makes it possible to detect the right or left turn intention of the driver based on the operation on the steering 46 (in other words, steering) by the driver. Therefore, it is possible to accurately detect the right or left turn intention of the driver (that is, the right or left turn of the vehicle 1) by simple processing without using, for example, map information, a peripheral image of the vehicle 1, or the like.

The control unit 32 may detect the right or left turn intention of the driver based on an operation of activating the direction indicator of the vehicle 1, that is, an operation on the blinker lever 81, instead of or in addition to the operation on the steering 46. In this case, the control unit 32 detects the right or left turn intention of the driver if the driver continues activating the direction indicator of the vehicle 1 for a predetermined time or more (for example, if the direction indicator of the vehicle 1 continues blinking for 5 [s] or more). Alternatively, in this case, the control unit 32 may detect the right or left turn intention of the driver if the driver blinks the direction indicator of the vehicle 1 a predetermined number of times or more (for example, six times or more) after the start of blinking. In this way, if the right or left turn intention of the driver is to be detected based on an operation of activating the direction indicator of the vehicle 1, that is, an operation on the blinker lever 81, it is also possible to accurately detect the right or left turn intention of the driver (that is, the right or left turn of the vehicle 1) by simple processing without using map information or a peripheral image of the vehicle 1.

The control unit 32 may detect the right or left turn intention of the driver based on a brake operation in addition to an operation on the steering 46 and/or the blinker lever 81. In this case, for example, the control unit 32 may detect the right or left turn intention of the driver based on a brake operation further performed (in other words, the driver activating the brake device of the vehicle 1) while the driver activates the direction indicator of the vehicle 1.

Operation when Vehicle Traveling Under ACC Turns Right or Left

Here, an example of an operation when the vehicle 1 traveling under ACC turns right or left will be described with reference to FIG. 2. In the following description, it is assumed that the steering angle θst is 0 when the steering 46 is at a predetermined center position, increases in the + direction when turned rightward (that is, turned clockwise) from the predetermined center position, and increases in the − direction when turned leftward (that is, turned counterclockwise). For the steering speed ω, the clockwise direction is defined as the + direction and the counterclockwise direction is defined as the − direction.

Figure 2:
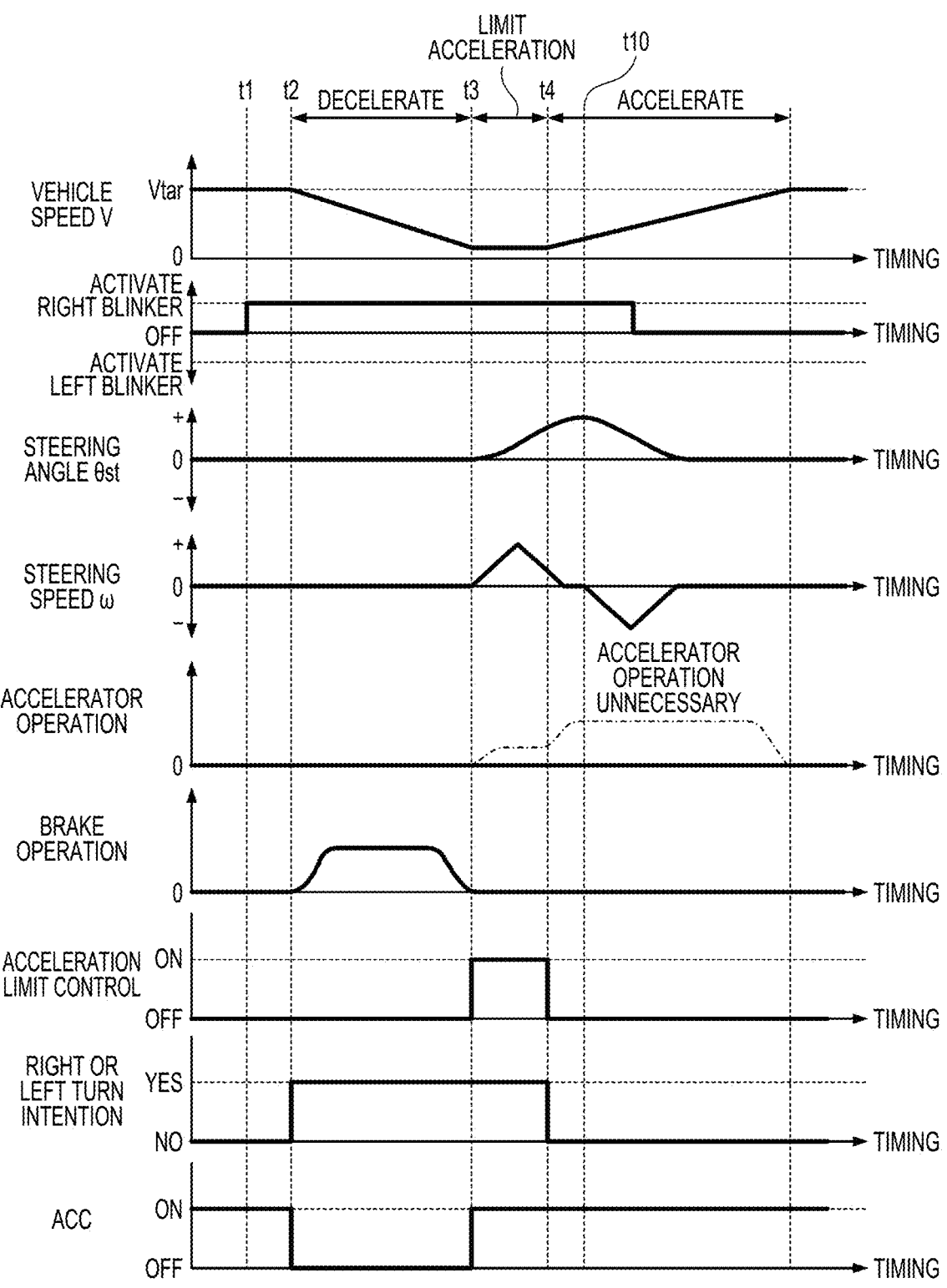
FIG. 2 is a diagram illustrating an example of an operation when the vehicle 1 traveling under ACC turns right or left.

As illustrated in FIG. 2, it is assumed that a right blinker activation operation is performed on the blinker lever 81 and the right blinker included in the direction indicator of the vehicle 1 is activated at a timing t1 when the vehicle 1 is traveling at a target speed Vtar under ACC. Here, the target speed Vtar is, for example, a target speed under ACC, and is a speed set in advance by the driver or the manufacturer of the vehicle 1.

It is assumed that the brake operation is performed at a timing t2 after the timing t1. In this case, for example, the control device 30 detects the right or left turn intention of the driver and decelerates the vehicle 1 in accordance with the brake operation from the timing t2, at which the brake operation is performed while the direction indicator of the vehicle 1 is activated. More specifically, at this time, the control device 30 temporarily stops the ACC, controls the drive source of the vehicle 1 via the driving force control system 60 so as not to perform acceleration by the ACC even if the vehicle speed V falls below the target speed Vtar, and controls the brake device of the vehicle 1 via the braking force control system 70 to generate a braking force corresponding to the brake operation (in other words, the operation amount on the brake pedal 72).

Then, from a timing t3 after the timing t2, the steering angle θst and the steering speed ω start to increase when the driver starts to turn the steering wheel 46. In the example illustrated in FIG. 2, since the driver starts to turn the steering 46 rightward, the steering angle θst and the steering speed ω start to increase in the + direction. In this way, when both the steering angle θst and the steering speed ω in the vehicle 1 become greater than the preset thresholds (for example, predetermined values greater than 0), the control device 30 resumes the ACC and starts the acceleration limit control.

When executing the acceleration limit control, if the vehicle speed V is lower than the target speed Vtar, the control device 30 accelerates the vehicle 1 such that the vehicle speed V reaches the target speed Vtar, but the upper limit value of the acceleration at this time is a predetermined value for acceleration limit control (for example, 0.5 [m/s²]). Thus, the control device 30 can maintain the vehicle speed V substantially constant during the acceleration limit control.

When the steering angle θst is increased to a certain degree (that is, when approaching the limit of steering), the driver turns the vehicle 1 while finely adjusting the steering angle θst at a gentle steering speed ω. Accordingly, as illustrated in FIG. 2, the steering speed ω starts to decrease from a timing slightly before a timing t10 at which the steering angle θst reaches maximum.

The control device 30 ends the acceleration limit control in response to such decrease in the steering speed ω in the vehicle 1 during the acceleration limit control. When the acceleration limit control is ended, the control device 30, for example, accelerates the vehicle 1 by the ACC such that the vehicle speed V reaches the target speed Vtar. At this time, the control device 30 accelerates the vehicle 1 at an acceleration higher than that during the acceleration limit control (for example, an acceleration higher than 0.5 [m/s²]). In the example illustrated in FIG. 2, the control device 30 ends the acceleration limit control at a timing t4 immediately after the decrease of the steering speed ω, and thereafter accelerates the vehicle 1 such that the vehicle speed V reaches the target speed Vtar at a predetermined acceleration greater than 0.5 [m/s²].

As described above, the control device 30 executes the acceleration limit control when the right or left turn intention of the driver is detected in the vehicle 1 traveling under ACC, and ends the acceleration limit control in response to a decrease in the steering speed ω in the vehicle 1 during the acceleration limit control. After the acceleration limit control is ended, the control device 30 accelerates the vehicle 1 such that the vehicle speed V reaches the target speed Vtar at an acceleration higher than that during the acceleration limit control. Thereby, when the vehicle 1 traveling under ACC turns right or left, the vehicle 1 can accelerate in a similar manner as that when the driver controls the vehicle speed V or the like to turn the vehicle 1 right or left. This can prevent the driver from feeling discomfort due to the manner of acceleration during right or left turn.

Acceleration when Turning Right or Left and Acceleration when Traveling Straight of Vehicle Traveling Under ACC In some cases, the vehicle 1 may turn right or left or may travel straight at an intersection. The control device 30 may control the acceleration of the vehicle 1 depending on whether the vehicle 1 traveling under ACC turns right or left or travels straight at the intersection.

Figure 3:
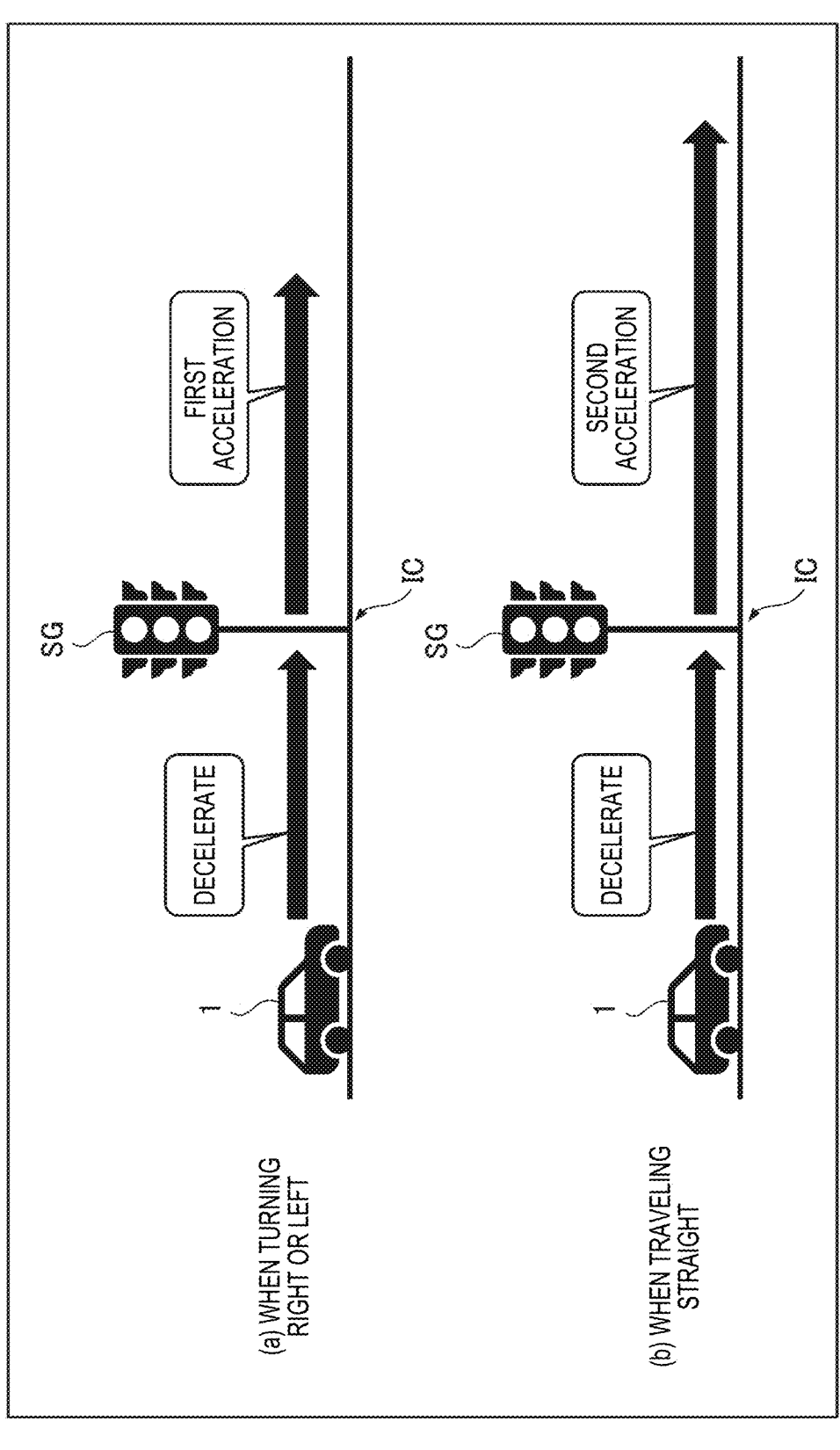
FIG. 3 is a diagram illustrating an example of the acceleration when traveling straight and the acceleration when turning right or left of the vehicle 1 traveling under ACC.

FIG. 3 is a diagram illustrating an example of the acceleration when turning right or left and the acceleration when traveling straight of the vehicle 1 traveling under ACC. (a) in FIG. 3 illustrates an example of the operation of vehicle 1 when turning right or left at an intersection IC. (b) in FIG. 3 illustrates an example of the operation of the vehicle 1 when traveling straight at the intersection IC.

In the example illustrated in FIG. 3, it is assumed that in either case of turning right or left or traveling straight at the intersection IC, a traffic light SG provided at the intersection IC is red light when the vehicle 1 approaches the intersection IC. Here, red light is a light form indicating that advancing beyond a predetermined stop position is forbidden. In this case, as illustrated in FIG. 3, the vehicle 1 decelerates in response to a brake operation by the driver from before the intersection IC, and stops at the predetermined stop position. Thereafter, when the traffic light SG is switched to green light, the vehicle 1 travels through the intersection IC. Here, green light is a light form indicating that advancing beyond the predetermined stop position is allowed.

When the vehicle 1 turns right or left at the intersection IC, the right or left turn intention of the driver is detected as described above. That is, in this case, as described above, the control device 30 executes the acceleration limit control in response to the detection of the right or left turn intention of the driver, and ends the acceleration limit control in response to a decrease in the steering speed ω in the vehicle 1 during the acceleration limit control. In this case, as illustrated in (a) of FIG. 3, the control device 30 accelerates the vehicle 1 at a first acceleration such that the vehicle speed V reaches the target speed Vtar when the acceleration limit control is ended. Here, the first acceleration is an acceleration lower than a second acceleration described later.

On the other hand, when the vehicle 1 travels straight through the intersection IC, the right or left turn intention of the driver is not detected. That is, in this case, the control device 30 does not execute the acceleration limit control. In this case, as illustrated in (b) of FIG. 3, when the brake operation is released and the traveling of the vehicle 1 is resumed, the control device 30 accelerates the vehicle 1 at a second acceleration such that the vehicle speed V reaches the target speed Vtar. Here, the second acceleration is an acceleration higher than the first acceleration described above, and is, for example, an acceleration set in advance by the driver or the manufacturer of the vehicle 1 as an acceleration usually used when performing acceleration by the ACC.

That is, in a case where the driver controls the vehicle speed V or the like to travel straight at the intersection IC, the driver generally performs an operation of accelerating the vehicle 1 at a higher acceleration than that when turning right or left at the intersection IC. In view of the operation that may be generally performed by the driver as described above, in the case where the vehicle 1 travels straight at the intersection IC (that is, in a case where the acceleration limit control is not executed because the right or left turn intention of the driver is not detected), the control device 30 accelerates the vehicle 1 at a higher acceleration than that in the case where vehicle 1 turns right or left at the intersection IC (that is, in the case where the acceleration limit control is executed because the right or left turn intention of the driver is detected). Thereby, when the vehicle 1 traveling under ACC travels straight at the intersection IC, the vehicle 1 can accelerate in a similar manner as that when the driver controls the vehicle speed V to travel straight at the intersection IC. This can prevent the driver from feeling discomfort due to such manner of acceleration. Therefore, without an accelerator operation and/or brake operation by the driver, it is possible to promote the utilization of ACC that allows the vehicle 1 to travel at an appropriate vehicle speed V, thereby improving the safety and convenience of the vehicle 1.

As described above, the control device 30 executes the acceleration limit control based on the detection of the right or left turn intention of the driver, and sets the acceleration for accelerating the vehicle 1 such that the vehicle speed V reaches the target speed Vtar to the first acceleration when the acceleration limit control is ended. On the other hand, if the acceleration limit control is not executed because the right or left turn intention of the driver is not detected, the control device 30 thereafter sets the acceleration for accelerating the vehicle 1 such that the vehicle speed V reaches the target speed Vtar to the second acceleration. Thereby, when the vehicle 1 traveling under ACC travels straight at the intersection IC, the vehicle 1 can accelerate in a similar manner as that when the driver controls the vehicle speed V to travel straight at the intersection IC. This can prevent the driver from feeling discomfort due to such manner of acceleration.

The first acceleration may be set based on, for example, the past driving characteristics of the driver in the vehicle 1. Accordingly, when the vehicle 1 traveling under ACC turns right or left, the acceleration of the vehicle 1 can be controlled in consideration of the past driving characteristics of the driver. Thereby, when the vehicle 1 traveling under ACC turns right or left, the vehicle 1 can accelerate in a similar manner as that when the driver controls the vehicle speed V to turn right or left. This can prevent the driver from feeling discomfort due to such manner of acceleration.

More specifically, for example, the control device 30 learns the acceleration when the driver controls the vehicle speed V or the like to turn the vehicle 1 right or left at intersections or the like as the past driving characteristics in the vehicle 1 of the driver, and sets the first acceleration based on the learning result. In this case, for example, the average value of the acceleration when the driver controls the vehicle speed V or the like to turn the vehicle 1 right or left at intersections or the like in a past predetermined period may be set as the first acceleration.

The first acceleration may be set based on, for example, the steering angle θst in the vehicle 1. Accordingly, when the vehicle 1 traveling under ACC turns right or left, the acceleration of the vehicle 1 can be controlled in consideration of the steering angle θst in the vehicle 1. Accordingly, the acceleration set as the first acceleration can be reduced, for example, when the steering angle θst is great such as when the vehicle 1 turns (for example, so-called U-turn), compared to when the steering angle θst is small. This can improve the safety of the vehicle 1.

More specifically, for example, the control device 30 may derive the first acceleration corresponding to the steering angle θst in the vehicle 1 with reference to a map defining the first acceleration for each steering angle θst, and set the first acceleration. In this case, the map defining the first acceleration for each steering angle θst is stored in advance in the control device 30 by, for example, the manufacturer of the vehicle 1.

The first acceleration may be set based on, for example, the legal speed of the road on which the vehicle 1 is traveling. Accordingly, when the vehicle 1 traveling under ACC turns right or left, the acceleration of the vehicle 1 can be controlled in consideration of the legal speed of the road on which the vehicle 1 is traveling. Accordingly, for example, it is possible to limit acceleration such that the vehicle speed V exceeds the legal speed. This can improve the safety of the vehicle 1. The control device 30 may obtain the legal speed of the road on which the vehicle 1 is traveling, for example, by performing image analysis on a peripheral image of the vehicle 1, or by referring to the map information database of the navigation device 20.

The first acceleration may be set freely by the driver by, for example, performing a predetermined operation on the operation input unit 80. Accordingly, when the vehicle 1 traveling under ACC turns right or left, the driver can control the acceleration of the vehicle 1 at a desired acceleration.

Processing Executed by Control Device

Next, an example of processing executed by the control device 30 will be described. First, an example of processing executed by the control device 30 to execute the ACC and acceleration limit control will be described with reference to FIG. 4.

Processing for Executing ACC and Acceleration Limit Control

As illustrated in FIG. 4, the control device 30 first determines whether there is an ACC on operation (step S1). If it is determined that there is no ACC on operation (step S1:

NO), the control device 30 repeats the processing of step S1 until it is determined that there is an ACC on operation. If it is determined that there is an ACC on operation (step S1: YES), the control device 30 starts the ACC (step S2).

Next, the control device 30 determines whether there is an ACC cancel operation (step S3). If it is determined that there is an ACC cancel operation (step S3: YES), the control device 30 ends the ACC (step S4) and ends the series of processing illustrated in FIG. 4.

If it is determined that there is no ACC cancel operation (step S3: NO), the control device 30 determines whether the driver is performing a brake operation (step S5). If it is determined that the driver is performing a brake operation (step S5: YES), the control device 30 temporarily stops the ACC and decelerates the vehicle 1 in response to the brake operation (step S6).

When temporarily stopping the ACC and decelerating the vehicle 1 in response to the brake operation, the control device 30 may notify the driver that the ACC is resumed via the display device of the touch panel 21, the speaker 22, or the like. In this way, when the vehicle 1 traveling under ACC is decelerated in response to the brake operation, if the driver desires to continue the ACC, it is possible to prevent the driver from unnecessary operations such as performing the ACC on operation again, thereby reducing the effort of the driver.

Next, the control device 30 determines whether there is an ACC cancel operation (step S7). If it is determined that there is an ACC cancel operation (step S7: YES), the control device 30 proceeds to the processing of step S4 described above. On the other hand, if it is determined that there is no ACC cancel operation (step S7: NO), the process returns to the processing of step S5 described above.

If it is determined that the driver is not performing the brake operation (step S5: NO), the control device 30 determines whether a right or left turn intention of the driver is detected by, for example, the processing illustrated in FIG. 5, etc. (step S8). When the right or left turn intention of the driver is detected (step S8: YES), the control device 30 executes the acceleration limit control (step S9), and returns to the processing of step S8 described above. When the right or left turn intention of the driver is not detected (step S8: NO), the control device 30 returns to the processing of step S3 described above.

Processing for Detecting Right or Left Turn Intent of Driver

Next, an example of processing executed by the control device 30 to detect the right or left turn intention of the driver will be described with reference to FIGS. 5 and 6. For example, in a period from when an ACC on operation is performed to when an ACC cancel operation is performed, the control device 30 repeatedly executes the series of processing illustrated in FIGS. 5 and 6 at predetermined intervals.

Figure 5:
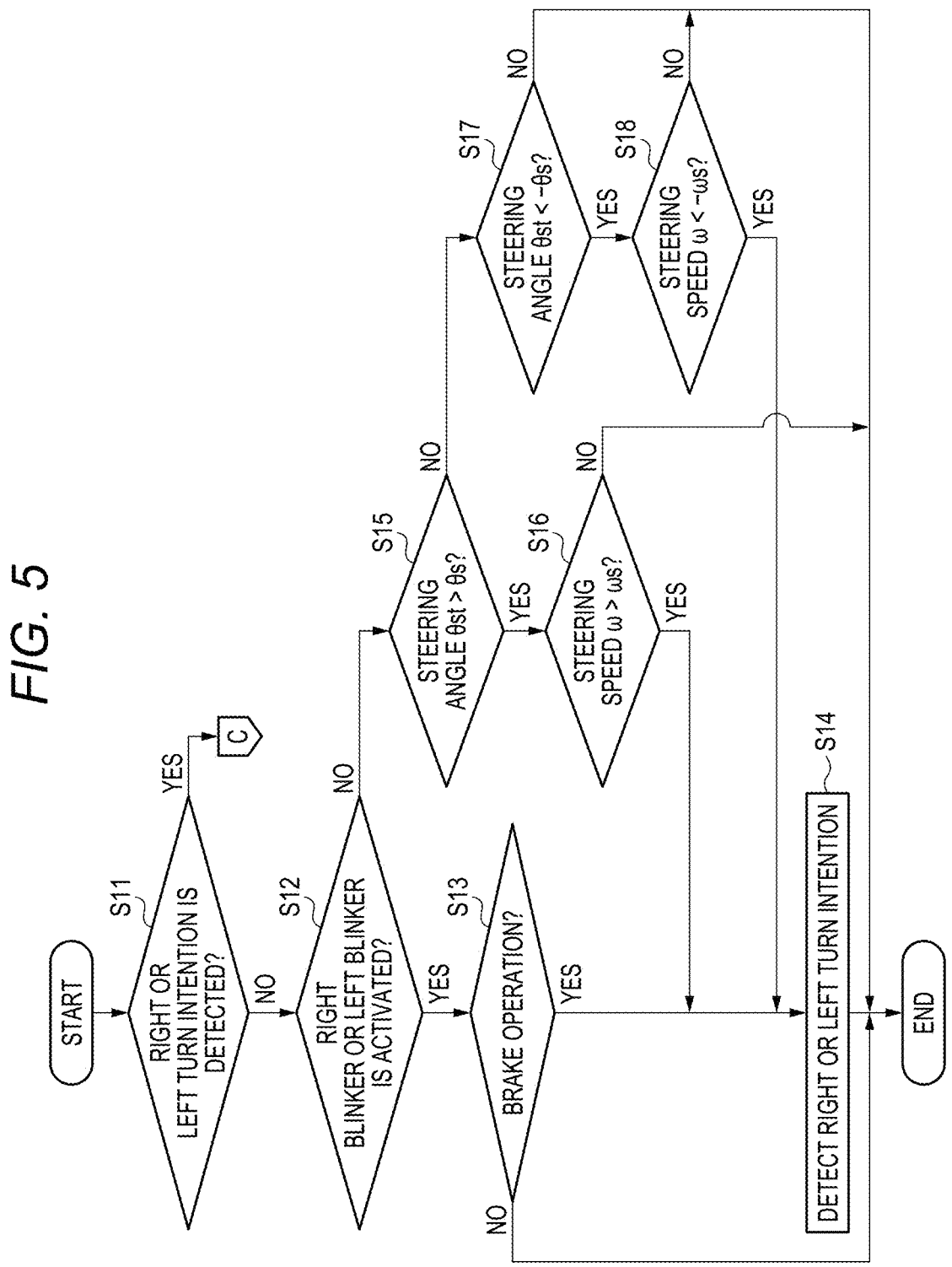
FIG. 5 is a flowchart (part 1) illustrating an example of processing executed by the control device 30 for detecting the right or left turn intention of the driver.

As illustrated in FIG. 5, the control device 30 first determines whether the right or left turn intention of the driver has been detected (step S11). When the right or left turn intention of the driver is not detected (step S11: NO), the control device 30 determines whether the right blinker is activated by performing a right blinker activation operation or whether the left blinker is activated by performing a left blinker activation operation (step S12).

If it is determined that the right blinker or the left blinker is activated (step S12: YES), the control device 30 determines whether there is a brake operation (step S13). If it is determined that there is a brake operation (step S13: YES), the control device 30 detects the right or left turn intention of the driver (step S14), and ends the series of processing illustrated in FIGS. 5 and 6. On the other hand, if it is determined that there is no brake operation (step S13: NO), the control device 30 directly ends the series of processing illustrated in FIGS. 5 and 6.

In the processing of step S12, if it is determined that the right blinker or the left blinker is not activated (step S12: NO), the control device 30 determines whether the steering angle θst is greater than a threshold θs (step S15). Here, the threshold θs is a threshold on the + side that is greater than 0, and is set in advance in the control device 30 by the manufacturer of the vehicle 1, for example.

If it is determined that the steering angle θst is greater than the threshold θs (step S15: YES), the control device 30 determines whether the steering speed ω is greater than a threshold ωs (step S16). Here, the threshold ωs is a threshold on the + side that is greater than 0 and greater than a threshold ωe, which will be described later, and is set in advance in the control device 30 by the manufacturer of the vehicle 1, for example.

If it is determined that the steering speed ω is greater than the threshold ωs (step S16: YES), the control device 30 proceeds to the processing of step S14 described above. On the other hand, if it is determined that the steering speed ω is not greater than the threshold ωs (step S16: NO), the control device 30 directly ends the series of processing illustrated in FIGS. 5 and 6.

If it is determined in the processing of step S15 that the steering angle θst is not greater than the threshold θs (step S15: NO), the control device 30 determines whether the steering angle θst is smaller than a threshold −θs (step S17). Here, the threshold −θs is a threshold on the − side obtained by reversing the sign (that is, positive or negative) of the threshold θs described above, and is set in advance in the control device 30 by the manufacturer of the vehicle 1, for example.

If it is determined that the steering angle θst is not smaller than the threshold −θs (step S17: NO), the control device 30 directly ends the series of processing illustrated in FIGS. 5 and 6. On the other hand, if it is determined that the steering angle θst is smaller than the threshold −θs (step S17: YES), the control device 30 determines whether the steering speed ω is smaller than a threshold −ωs (step S18). Here, the threshold −ωs is a threshold on the − side obtained by reversing the sign of the threshold ωs described above, and is set in advance in the control device 30 by the manufacturer of the vehicle 1, for example.

If it is determined that the steering speed ω is not smaller than the threshold −ωs (step S18: NO), the control device 30 directly ends the series of processing illustrated in FIGS. 5 and 6. On the other hand, if it is determined that the steering speed ω is smaller than the threshold −ωs (step S18: YES), the control device 30 proceeds to the processing of step S14 described above.

In the processing of step S11, if it is determined that the right or left turn intention of the driver has been detected (step S11: YES), as illustrated in FIG. 6, the control device 30 determines whether the steering angle θst is greater than 0 (step S19). If it is determined that the steering angle θst is greater than 0 (step S19: YES), the control device 30 determines whether the steering speed ω is smaller than a threshold ωe (step S20). Here, the threshold ωe is a threshold on the + side that is greater than 0, and is set in advance in the control device 30 by the manufacturer of the vehicle 1, for example.

If it is determined that the steering speed ω becomes smaller than the threshold ωe (step S20: YES), the control device 30 determines that the right or left turn of the vehicle 1 is substantially completed and the driver has no right or left turn intention (step S21), and ends the series of processing illustrated in FIGS. 5 and 6. On the other hand, if it is determined that the steering speed ω has not become smaller than the threshold ωe (step S20: NO), the control device 30 directly ends the series of processing illustrated in FIGS. 5 and 6.

In the processing of step S19, if it is determined that the steering angle θst is not greater than 0 (step S19: NO), the control device 30 determines whether the steering angle θst is smaller than 0 (step S22). If it is determined that the steering angle θst is smaller than 0 (step S22: YES), the control device 30 determines whether the steering speed ω is greater than a threshold −ωe (step S23). Here, the threshold −ωe is a threshold on the − side obtained by reversing the sign of the threshold ωe described above, and is set in advance in the control device 30 by the manufacturer of the vehicle 1, for example.

If it is determined that the steering speed ω has become greater than the threshold −ωe (step S23: YES), the control device 30 proceeds to the processing of step S21 described above. On the other hand, if it is determined that the steering speed ω has not become greater than the threshold −ωe (step S23: NO), the control device 30 directly ends the series of processing illustrated in FIGS. 5 and 6.

Figure 6:
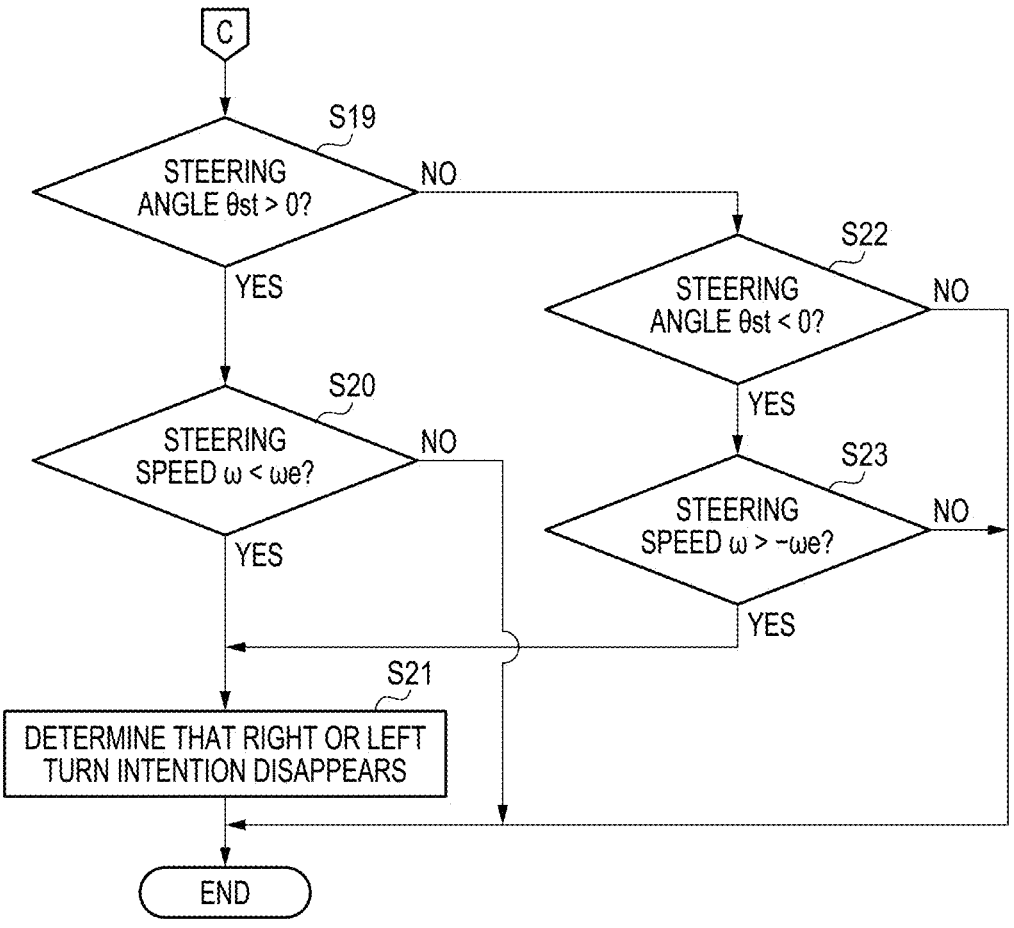
FIG. 6 is a flowchart (part 2) illustrating an example of processing executed by the control device 30 for detecting the right or left turn intention of the driver.

In the example illustrated in FIGS. 5 and 6, the control device 30 detects the right or left turn intention of the driver based on the determination that a brake operation has been performed in the processing of step S13, but is not limited thereto. For example, if the control device 30 determines that the right blinker or the left blinker is activated from the processing of step S12, the control device 30 may directly proceed to the processing of step S14 to detect the right or left turn intention of the driver.

As described above, the control device 30 can detect the right or left turn intention of the driver and execute the acceleration limit control based on both the steering angle θst and the steering speed ω in the vehicle 1 becoming greater than the thresholds θs and ωs in the + direction or becoming smaller than the thresholds −θs and −ωs in the − direction. Further, the control device 30 can detect the right or left turn intention of the driver and execute the acceleration limit control based on the right blinker activation operation and the left blinker activation operation for activating the direction indicator of the vehicle 1. Thus, the control device 30 can accurately detect the intention of right or left turn of the driver and appropriately start the acceleration limit control from the normal operation performed by the driver to turn the vehicle 1 right or left.

Further, when the driver turns the vehicle 1 right or left, the control device 30 can accurately detect that the end of the steering is approaching and appropriately end the acceleration limit control by utilizing the property that the absolute value of the steering speed ω decreases as the steering angle θst approaches the target value. Thereby, when the vehicle 1 traveling under ACC turns right or left, the vehicle 1 can accelerate in a similar manner as that when the driver controls the vehicle speed V or the like to turn the vehicle 1 right or left. This can prevent the driver from feeling discomfort due to the manner of acceleration during right or left turn.

If a brake operation is performed in the vehicle 1 traveling under ACC (that is, if the driver activates the brake device of the vehicle 1), the control device 30 temporarily stops the ACC so as not to perform acceleration by the ACC even if the vehicle speed V falls below the target speed Vtar, and decelerates the vehicle 1 in response to the brake operation.

Then, after the brake operation is released, the control device 30 resumes the control of the vehicle 1 (that is, the ACC) such that the vehicle speed V reaches the target speed Vtar. Thus, compared to the case where the ACC is ended in response to the brake operation, it is possible to reduce the effort of the driver for resuming the ACC. Furthermore, when the vehicle 1 is decelerated in response to a brake operation, by notifying the driver that ACC will be resumed, it is possible to prevent the driver from performing unnecessary operations for resuming the ACC, thereby reducing the effort of the driver.

Although one embodiment of the present disclosure has been described, it goes without saying that the present disclosure is not limited to this embodiment. It is apparent that those skilled in the art can conceive of various modifications and alterations within the scope described in the claims, and it is understood that such modifications and alterations naturally fall within the technical scope of the present disclosure. Further, the constituent elements in the embodiment described above may be combined freely in a scope not departing from the gist of the disclosure.

In the embodiment described above, a four-wheeled automobile is exemplified as the vehicle, but the present disclosure is not limited thereto. A vehicle to which the technique of the present disclosure can be applied may be a two-wheeled automobile (so-called motorcycle).

The embodiment described above have described a control device 30 of a vehicle 1 that can travel under ACC (constant speed travel control and inter-vehicle distance control), but the control device of the present disclosure can also be applied to a control device for a vehicle that does not have the function of inter-vehicle distance control and can travel under constant speed travel control (cruise control).

In the present description, at least the following matters are described. Although corresponding constituent elements or the like in the embodiment described above are shown in parentheses, the present disclosure is not limited thereto.

(1) A vehicle control device (control device 30), in which the vehicle control device is configured to execute travel control of controlling a vehicle (vehicle 1) such that a travel speed of the vehicle is a target speed corresponding to an inter-vehicle distance between the vehicle and a preceding vehicle traveling in front of the vehicle, or a predetermined target speed set by a driver of the vehicle, and acceleration limit control of limiting acceleration of the vehicle by the travel control, and the vehicle control device comprises a controller (control unit 32) configured to execute the acceleration limit control when an intention to turn right or left of the driver is detected in the vehicle traveling under the travel control, and to end the acceleration limit control in response to a decrease in a steering speed (steering speed ω) in the vehicle during the acceleration limit control.

According to (1), when a vehicle traveling under travel control turns right or left, the vehicle can accelerate in a similar manner as that when the driver controls the travel speed of the vehicle to turn the vehicle right or left. This can prevent the driver from feeling discomfort due to the manner of acceleration during right or left turn. Therefore, it is possible to promote the utilization of travel control that allows the vehicle to travel at an appropriate travel speed without requiring an accelerator operation and/or brake operation by the driver, thereby improving the safety and convenience of the vehicle. This can further improve traffic safety and contribute to development of a sustainable transportation system.

(2) The vehicle control device according to (1), in which the controller is configured to detect the intention to turn right or left based on both a steering angle (steering angle θst) and the steering speed in the vehicle becoming greater than preset thresholds.

According to (2), it is possible to detect the right or left turn intention of the driver based on the steering of the vehicle by the driver. Therefore, it is possible to accurately detect the right or left turn intention of the driver (that is, the right or left turn of the vehicle) by simple processing without using, for example, map information, a peripheral image of the vehicle, or the like.

(3) The vehicle control device according to (1) or (2), in which the controller is configured to detect the intention to turn right or left based on the driver activating a direction indicator of the vehicle.

According to (3), it is possible to detect the right or left turn intention of the driver based on the driver activating the direction indicator of the vehicle. Therefore, it is possible to accurately detect the right or left turn intention of the driver (that is, the right or left turn of the vehicle) by simple processing without using, for example, map information, a peripheral image of the vehicle, or the like.

(4) The vehicle control device according to any one of (1) to (3), in which the controller is configured to decelerate the vehicle when the driver activates a brake of the vehicle in the vehicle traveling under the travel control, and to resume the travel control when the brake is released.

According to (4), it is possible to reduce the effort of the driver for resuming the travel control after activating the brake of the vehicle.

(5) The vehicle control device according to (4), in which the controller is configured to notify the driver that the travel control is resumed when the vehicle is decelerated in response to the brake.

According to (5), it is possible to prevent the driver from performing unnecessary operations for resuming the travel control, thereby reducing the effort of the driver.

(6) The vehicle control device according to any one of (1) to (5), in which the controller is configured to set an acceleration for accelerating the vehicle to a first acceleration by the travel control such that the travel speed reaches the target speed when the intention to turn right or left is detected, and the controller is configured to set the acceleration for accelerating the vehicle to a second acceleration by the travel control such that the travel speed reaches the target speed when the intention to turn right or left is not detected, and the first acceleration is smaller than the second acceleration.

According to (6), the vehicle traveling under travel control can accelerate in different manners when turning left or right and when traveling straight, similar as when the driver controls the travel speed of the vehicle. This can prevent the driver from feeling discomfort due to the manner of acceleration when the vehicle traveling under travel control turns right or left or travels straight.

(7) The vehicle control device according to (6), in which when the intention to turn right or left is detected, the controller is configured to accelerate the vehicle at the first acceleration such that the travel speed reaches the target speed upon an end of the acceleration limit control, and

the first acceleration is set based on past driving characteristics in the vehicle of the driver.

According to (7), when the vehicle traveling under travel control turns right or left, the acceleration of the vehicle can be controlled in consideration of the past driving characteristics of the driver. As a result, when the vehicle traveling under travel control turns right or left, the acceleration of the vehicle can be controlled in a similar manner as that when the driver controls the acceleration of the vehicle. This can prevent the driver from feeling discomfort due to the manner of acceleration at that time.

(8) The vehicle control device according to (6), in which when the intention to turn right or left is detected, the controller is configured to accelerate the vehicle at the first acceleration such that the travel speed reaches the target speed upon an end of the acceleration limit control, and the first acceleration is set based on the steering angle in the vehicle.

According to (8), when the vehicle traveling under travel control turns right or left, the acceleration of the vehicle can be controlled in consideration of the steering angle in the vehicle. Accordingly, the acceleration of the vehicle can be reduced, for example, when the steering angle is great such as when the vehicle turns (for example, so-called U-turn). This can improve the safety of the vehicle.

(9) The vehicle control device according to (6), in which when the intention to turn right or left is detected, the controller is configured to accelerate the vehicle at the first acceleration such that the travel speed reaches the target speed upon an end of the acceleration limit, and the first acceleration is set based on a legal speed of a road on which the vehicle is traveling.

According to (9), when the vehicle traveling under travel control turns right or left, the acceleration of the vehicle can be controlled in consideration of the legal speed of the road on which the vehicle is traveling. Accordingly, for example, it is possible to limit acceleration such that the travel speed of the vehicle exceeds the legal speed. This can improve the safety of the vehicle.

(10) A control method executable by a computer for executing travel control of controlling a vehicle such that a travel speed of the vehicle is a target speed corresponding to an inter-vehicle distance between the vehicle and a preceding vehicle traveling in front of the vehicle, or a predetermined target speed set by a driver of the vehicle, and acceleration limit control of limiting acceleration of the vehicle by the travel control, the control method comprising:

executing the acceleration limit control when an intention to turn right or left of the driver is detected in the vehicle traveling under the travel control; and ending the acceleration limit control in response to a decrease in a steering speed in the vehicle during the acceleration limit control.

According to (10), when a vehicle traveling under travel control turns right or left, the vehicle can accelerate in a similar manner as that when the driver controls the travel speed of the vehicle to turn the vehicle right or left. This can prevent the driver from feeling discomfort due to the manner of acceleration during right or left turn. Therefore, without an accelerator operation and/or brake operation by the driver, it is possible to promote the utilization of constant speed travel control that allows the vehicle to travel at an appropriate travel speed, thereby improving the safety and convenience of the vehicle. This can further improve traffic safety and contribute to development of a sustainable transportation system.

18

The invention claimed is:

1. A vehicle control device, wherein
the vehicle control device is configured to execute travel control of controlling a vehicle such that a travel speed of the vehicle is a target speed corresponding to an inter-vehicle distance between the vehicle and a preceding vehicle traveling in front of the vehicle, or a predetermined target speed set by a driver of the vehicle, and acceleration limit control of limiting acceleration of the vehicle by the travel control,
the vehicle control device comprises a controller configured to execute the acceleration limit control when an intention to turn right or left of the driver is detected in the vehicle traveling under the travel control, and to end the acceleration limit control in response to a decrease in a steering speed in the vehicle during the acceleration limit control,
the controller is configured to set an acceleration for accelerating the vehicle to a first acceleration by the travel control such that the travel speed reaches the target speed when the intention to turn right or left is detected,
the controller is configured to set the acceleration for accelerating the vehicle to a second acceleration by the travel control such that the travel speed reaches the target speed when the intention to turn right or left is not detected,
the first acceleration is smaller than the second acceleration,
when the intention to turn right or left is detected, the controller is configured to accelerate the vehicle at the first acceleration such that the travel speed reaches the target speed upon an end of the acceleration limit control, and
the first acceleration is set based on at least one of past driving characteristics in the vehicle of the driver, a steering angle in the vehicle, or a legal speed of a road on which the vehicle is traveling.

2. The vehicle control device according to claim 1, wherein
the controller is configured to detect the intention to turn right or left based on both the steering angle and the steering speed in the vehicle becoming greater than preset thresholds.

3. The vehicle control device according to claim 1, wherein
the controller is configured to detect the intention to turn right or left based on the driver activating a direction indicator of the vehicle.

4. The vehicle control device according to claim 1, wherein
the controller is configured to decelerate the vehicle when the driver activates a brake of the vehicle in the vehicle traveling under the travel control, and to resume the travel control when the brake is released.

5. The vehicle control device according to claim 4, wherein
the controller is configured to notify the driver that the travel control is resumed when the vehicle is decelerated in response to the brake.

6. The vehicle control device according to claim 1, wherein
the first acceleration is set based on past driving characteristics in the vehicle of the driver.

7. The vehicle control device according to claim 1, wherein

19 the first acceleration is set based on the steering angle in the vehicle.

8. The vehicle control device according to claim 1, wherein the first acceleration is set based on a legal speed of a road on which the vehicle is traveling.

9. A control method executable by a computer for executing travel control of controlling a vehicle such that a travel speed of the vehicle is a target speed corresponding to an inter-vehicle distance between the vehicle and a preceding vehicle traveling in front of the vehicle, or a predetermined target speed set by a driver of the vehicle, and acceleration limit control of limiting acceleration of the vehicle by the travel control, the control method comprising:

executing the acceleration limit control when an intention to turn right or left of the driver is detected in the vehicle traveling under the travel control;

ending the acceleration limit control in response to a decrease in a steering speed in the vehicle during the acceleration limit control;

setting an acceleration for accelerating the vehicle to a first acceleration by the travel control such that the travel speed reaches the target speed when the intention to turn right or left is detected;

setting the acceleration for accelerating the vehicle to a second acceleration by the travel control such that the travel speed reaches the target speed when the intention to turn right or left is not detected, the first acceleration being smaller than the second acceleration; and when the intention to turn right or left is detected, accelerating the vehicle at the first acceleration such that the travel speed reaches the target speed upon an end of the acceleration limit control, wherein the first acceleration is set based on at least one of past driving characteristics in the vehicle of the driver, a steering angle in the vehicle, or a legal speed of a road on which the vehicle is traveling.

* * * * *